United States Patent
Lee et al.

(10) Patent No.: US 9,408,279 B2
(45) Date of Patent: Aug. 2, 2016

(54) SYSTEM AND METHOD FOR INTELLIGENT LIGHTING SYSTEMS

(71) Applicant: Myreka Technologies Sdn Bhd, Penang (MY)

(72) Inventors: Eu Beng Lee, Penang (MY); Kian Meng Tey, Penang (MY)

(73) Assignee: MYREKA TECHNOLOGIES SDN BHD (MY)

( * ) Notice: Subject to any disclaimer, the term of this patent is extended or adjusted under 35 U.S.C. 154(b) by 87 days.

(21) Appl. No.: 14/336,421

(22) Filed: Jul. 21, 2014

(65) Prior Publication Data

US 2016/0021721 A1 Jan. 21, 2016

(51) Int. Cl.
*H05B 37/02* (2006.01)

(52) U.S. Cl.
CPC ............ *H05B 37/0218* (2013.01); *H05B 37/02* (2013.01); *H05B 37/0281* (2013.01)

(58) Field of Classification Search
CPC ....................................................... H05B 37/02
USPC ......... 315/149, 152, 158, 291, 307, 308, 312, 315/360
See application file for complete search history.

(56) References Cited

U.S. PATENT DOCUMENTS

| | | | |
|---|---|---|---|
| 7,571,063 B2 | 8/2009 | Howell et al. | |
| 7,847,706 B1 | 12/2010 | Ross et al. | |
| 8,593,268 B2 | 11/2013 | Valetutti | |
| 8,941,308 B2 * | 1/2015 | Briggs | H05B 37/0218 315/149 |
| 2007/0153524 A1 * | 7/2007 | Lee | H05B 37/0218 362/276 |
| 2009/0322253 A1 | 12/2009 | Buelow, II et al. | |
| 2010/0030389 A1 | 2/2010 | Palmer et al. | |
| 2010/0295454 A1 * | 11/2010 | Reed | H05B 37/0218 315/152 |
| 2011/0109236 A1 * | 5/2011 | Zhurin | H05B 33/0842 315/209 R |
| 2011/0304273 A1 * | 12/2011 | Bennette | H05B 37/0227 315/159 |
| 2014/0028198 A1 * | 1/2014 | Reed | H05B 33/0884 315/152 |

* cited by examiner

*Primary Examiner* — Tung X Le (74) *Attorney, Agent, or Firm* — Mannava & Kang, P.C.

(57) ABSTRACT

An intelligent system for controlling an exterior landscape lighting system by self calibration and self adjustments in real-time includes a plurality of lighting units, each lighting unit comprising a light sensor, a clocking device is electrically connected to each lighting unit, a power supply means operable to provide electrical power for operation of the clocking device, and a controller unit comprising a memory for storing a pre-recorded historical data and executing a set of instructions to control on and off times of each lighting unit.

21 Claims, 3 Drawing Sheets

SYSTEM AND METHOD FOR INTELLIGENT LIGHTING SYSTEMS

TECHNICAL FIELD

Embodiments of the present invention generally relate to exterior lamps or lighting systems, and more particularly, to system, device and method to automatically control turning on and off outside lighting systems.

BACKGROUND

Generally, lamps or lighting systems utilize some form of photocell control for activating and deactivating the outdoor lighting based upon day and night conditions. Particularly, the photocell is used to sense ambient lighting from the sun, turn on the lighting when the sunlight is below a certain level, and turn off the lighting when the sunlight is above a certain level. More specifically, all the landscape lighting systems are normally powered by 12 volts (V) alternating current (AC) by means of a transformer which converts an AC household power input (typically 120 V AC) to the 12 Volts AC. The transformer is an essential element owing to the power input specifications of the various lighting elements which make up the lighting systems. However, this method may leave lights on longer than necessary before turning them off in the morning.

Lamps or lighting systems are available with automatic on and off mechanism. Examples of such products are street light or building façade lights. Conventionally, setting up the on/off control of lamps or lighting systems has been achieved in a number of different ways, these including installing a timer on the primary winding of the transformer. Particularly, the timer set is used to turn on the lights at a particular time and turn them off at a second particular time. However, simple timer assemblies requires frequent readjustment particularly following power outages and further that the transformer must be located in an area accessible to the user in order to make the necessary adjustments. Moreover, as the day's progress and sunrise and sunset times change, the timer must be reset frequently.

Currently, existing street light utilizes a photo sensor to sense the ambient light condition. If the ambient light condition drops below a certain level, the street light will turn on. Similarly when the ambient light condition is above a certain level, the street light will turn off. However given the resources and maintenance cost, the street light and sensors are not maintained regularly, calibrated or replaced. As a result, it is often observed that many street lights are still on when it is already bright outside in day light or many street lights are still off when it is dark outside. Consequently, this results in number of accidents on road. Moreover, street lamps are still on when it is not suppose to or when it is bright light in day time which results in wastage of energy.

As it is well known in the art, various street lights that are turn on or off automatically are controlled by photo sensors. More specifically, when the sensor detects low ambient light, it triggers the lamp to turn on. However, the problem is that the sensors become faulty or degrade over time and need to be replaced or calibrated. Replacing or calibrating the sensors requires a lot of effort, resources, time and money. In practice, if it is required to calibrate or replace all the sensors for each street light for the entire state or country is a cumbersome task to perform. In many situations street lights are located in remote areas. For this reason many of the street light sensors do not get maintained. As a result, it is not uncommon to see street lights that have not turned on when it is already dark or see street lights that are still on when it is already bright outside. When the former occurs, accidents can happen and human lives are at risk. When the latter happens, energy wastage occurs. With the rising cost of electricity multiplied by the number of street lights, the wastage is very substantial.

Another possible method is to use an astronomic time clock to control the timing of the lighting. However, it is necessary to correctly set an astronomic clock.

Outside lighting control is addressed in a variety of patents. U.S. Patent Application 2010/0030389 (Palmer et al) discloses personal computer control of automatic irrigation and lighting systems. A lighting zone can be set in accordance with sunrise and sunset times. Given the location, a forecasting site provides sunrise and sunset data at preset intervals. However, this requires an active connection to the Internet. The schedule can be transmitted by email.

U.S. Pat. No. 7,847,706 (Ross et al) illustrates a lighting control unit using location to calculate sunrise and sunset times. However, this method requires frequent communication with a wireless network.

U.S. Pat. No. 7,571,063 (Howell et al) teaches lighting control and performance monitoring. For example, lights can be turned off or dimmed at an earlier hour on Sunday when a store closes earlier than other days. However, this method depends on setting a timer for particular on and off times.

U.S. Patent Application 2009/0322253 (Buelow II et al) teaches that a command system schedules changes in mode of a LED lighting system based on input from the atomic time clock.

U.S. Pat. No. 8,593,268 (Valetutti, Vincent) teaches a device and method to automatically control timing of outside lighting. Particularly, an ephemeris program and a calendar are loaded into memory on a timing device. The present invention uses a GPS system to determine the physical location. Therefore, a GPS system has to be embedded into the system and have constant communication with the satellite. More specifically, the calendar is loaded into the memory to determine the day. Once the physical location and the day are determined, the on/off time is calculated based on the ephemeris program. An ephemeris is an astronomical chart which provides the relative movement/position of the earth relative to the sun.

Accordingly, there remains a need in the art for system and method to automatically control turning on and off outside lighting systems.

DISCLOSURE OF THE INVENTION

Embodiments of the present invention aim to provide a method to automatically operate and control an exterior landscape lighting system includes at least one lighting unit. Particularly, the method includes the steps of installing the at least one lighting unit, activating a clocking device electrically connected to the at least one lighting unit by applying power to the clocking device, processing a self-calibrated program and retrieving a pre-recorded historical data from memory of a controller unit. In use, the controller unit is being electrically coupled to the at least one lighting unit. The method further includes the steps of sensing ambient light condition and designating a fixed value of illumination emittance of ambient light based on the retrieved pre-recorded historical data, setting a pre-determined optimum duration set value to the at least one lighting unit based on the pre-recorded historical data, measuring a first value time duration of the actual illumination emittance of ambient light, and evaluating a first measured value of illumination emittance of ambient light between lighting on and off times of the at least one lighting unit by the program in real-time.

Embodiments of the present invention further aim to provide an intelligent system for controlling an exterior landscape lighting system by self calibration and self adjustments in real-time, the system includes a plurality of lighting units, each lighting unit includes a light sensor and the light sensor is operative to sense illumination emittance of ambient light, at least one clocking device electrically connected to each lighting unit, and the at least one clocking device being operative to calculate an optimum time period between switching on and switching off of each lighting unit, a power supply means operable to provide electrical power for operation of the clocking device, and a controller unit includes a memory for storing a pre-recorded historical data and executing a set of instructions to control on and off times of each lighting unit of the plurality of lighting units.

Embodiments of the present invention aim to provide a device to automatically control on and off timing of an exterior landscape lighting system includes at least one clocking device electrically connected to each lighting unit of the exterior landscape lighting system, wherein the at least one clocking device is operative to calculate an optimum time period between switching on and switching off of each lighting unit, a power supply means operable to provide electrical power for operation of each clocking device, a controller unit includes a memory for storing a pre-recorded historical data and executing a set of instructions to control on and off times of at least one lighting unit, and a program to calculate lighting on and off times by retrieving data from the pre-recorded historical data.

In accordance with an embodiment of the present invention, each lighting unit includes a control circuit for controlling signals from the controller unit.

In accordance with an embodiment of the present invention, the controller unit performs one or more functions selected from a group including activating the clocking device by applying power to the clocking device, processing a self-calibrated program and retrieving the pre-recorded historical data, sensing ambient light condition and designating a fixed value of illumination emittance of ambient light based on the retrieved pre-recorded historical data, setting a pre-determined optimum duration set value to the at least one lighting unit based on the pre-recorded historical data, measuring a first value time duration of the actual illumination emittance of ambient light, evaluating a first measured value of illumination emittance of ambient light between lighting on and off times of the at least one lighting unit, evaluating a second measured value of an actual illumination emittance of ambient light in real-time, determining whether the second measured value of an actual illumination emittance of ambient light in real-time is more than the pre-determined set value of the at least one lighting unit, determining and deriving a new set value of illumination emittance of ambient light in real-time by iteratively averaging at least two optimum values from a previous set of iterations of said first measured value and said second measured value, storing a plurality of measured values of illumination emittance of ambient light between lighting on and off times of the at least one lighting unit, generating a data trend from the plurality of measured values over a period of time, comparing the data trend with the pre-recorded historical data, and determining current date, day and month of a year and right optimum duration to turn the at least one lighting unit on and off at installation of the lighting system by executing the program and retrieving the pre-recorded historical data. In operation, the at least one lighting unit is automatically switched off when the second measured value of an actual illumination emittance of ambient light in real-time is more than the pre-determined set value of the at least one lighting unit. More specifically, the at least one lighting unit is switched off automatically when the first value of the actual illumination emittance of ambient light in real-time is greater than the pre-determined set value of the at least one lighting unit.

In accordance with an embodiment of the present invention, at least one lighting unit is activated automatically when the first measured value of the actual illumination emittance of ambient light in real-time is less than the pre-determined set value of the at least one lighting unit.

In accordance with an embodiment of the present invention, the method further includes the steps of evaluating a second measured value of an actual illumination emittance of ambient light in real-time, and determining whether the second measured value of an actual illumination emittance of ambient light in real-time is more than the pre-determined set value of the at least one lighting unit.

In accordance with an embodiment of the present invention, the method further includes the step of determining and deriving a new set value of illumination emittance of ambient light in real-time by iteratively averaging at least two optimum values from a previous set of iterations of the first measured value and the second measured value.

In accordance with an embodiment of the present invention, the at least one lighting unit is automatically switched off when the second measured value of an actual illumination emittance of ambient light in real-time is more than the pre-determined set value of the at least one lighting unit.

In accordance with an embodiment of the present invention, the method further includes the steps of storing a plurality of measured values of illumination emittance of ambient light between lighting on and off times of the at least one lighting unit in memory of the controller unit, generating a data trend from the plurality of measured values over a period of time, comparing the data trend with the pre-recorded historical data, and determining current date, day and month of a year and right optimum duration to turn the at least one lighting unit on and off at installation of the lighting system by executing the program and retrieving the pre-recorded historical data.

In accordance with an embodiment of the present invention, the exterior landscape lighting system is self-calibrating and self-adjusting closed loop system and continuously calculates lighting on and off optimum duration by executing a set of instructions of the program based on the data retrieved from the pre-recorded historical data from memory and turning the at least one lighting unit on and off based on calculated the on and off times.

In accordance with an embodiment of the present invention, the first value time duration of the actual illumination emittance of ambient light is measured and the at least one lighting unit is activated automatically when the first measured value is less than the set value of the at least one lighting unit.

In accordance with an embodiment of the present invention, the pre-recorded historical data includes data related to number of hours of daylight per day.

In accordance with an embodiment of the present invention, the pre-determined optimum duration is a time period for which the at least one lighting unit is switched on.

While the invention is described herein by way of example using several embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits and advantages of the present invention will become apparent by reference to the following text figures, with like reference numbers referring to like structures across the views, wherein.

Embodiments of the present invention aim to provide lamps or lighting systems with automatic on and off mechanism. Examples of such products include but not limited to street light or building façade lights. The present invention provides an intelligent solution with a closed loop system which is self calibrating and self adjusting to achieve optimum efficiency. More specifically, the present invention discloses a lighting system that is self calibrating and self adjusting and intelligent to know the optimum condition to turn on and off.

Figure 1:
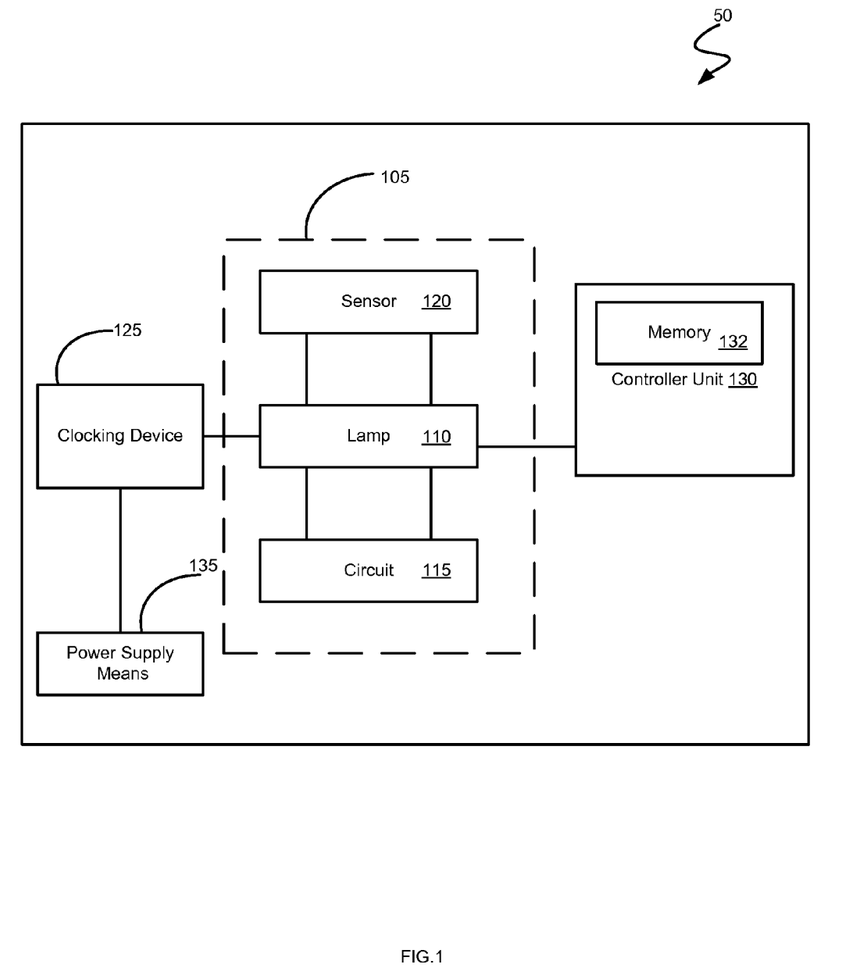
FIG. 1 illustrates a block diagram of a device to automatically control on and off timing of an exterior landscape lighting system, in accordance with an embodiment of the present invention.

FIG. 1 illustrates a block diagram of a device 50 to automatically control on and off timing of an exterior landscape lighting system, in accordance with an embodiment of the present invention. The device 50 to automatically control on and off timing of an exterior landscape lighting system 100 includes a clocking device 125 electrically connected to each lighting unit 105 of the exterior landscape lighting system 100, wherein the clocking device 125 is operative to calculate an optimum time period between switching on and switching off of each lighting unit 105, the power supply means 135 is operable to provide electrical power for operation of each clocking device 125, the controller unit 130 includes the memory 132 for storing the pre-recorded historical data and executing a set of instructions to control on and off times of the one or more lighting units 105, and the program to calculate lighting on and off times by retrieving data from the pre-recorded historical data. Particularly, each lighting unit 105 includes the control circuit 115 for controlling signals from the controller unit 130. The pre-determined optimum duration is the time period for which the one or more lighting units 105 are switched on. More specifically, the pre-recorded historical data includes data related to number of hours of daylight per day.

Figure 2:
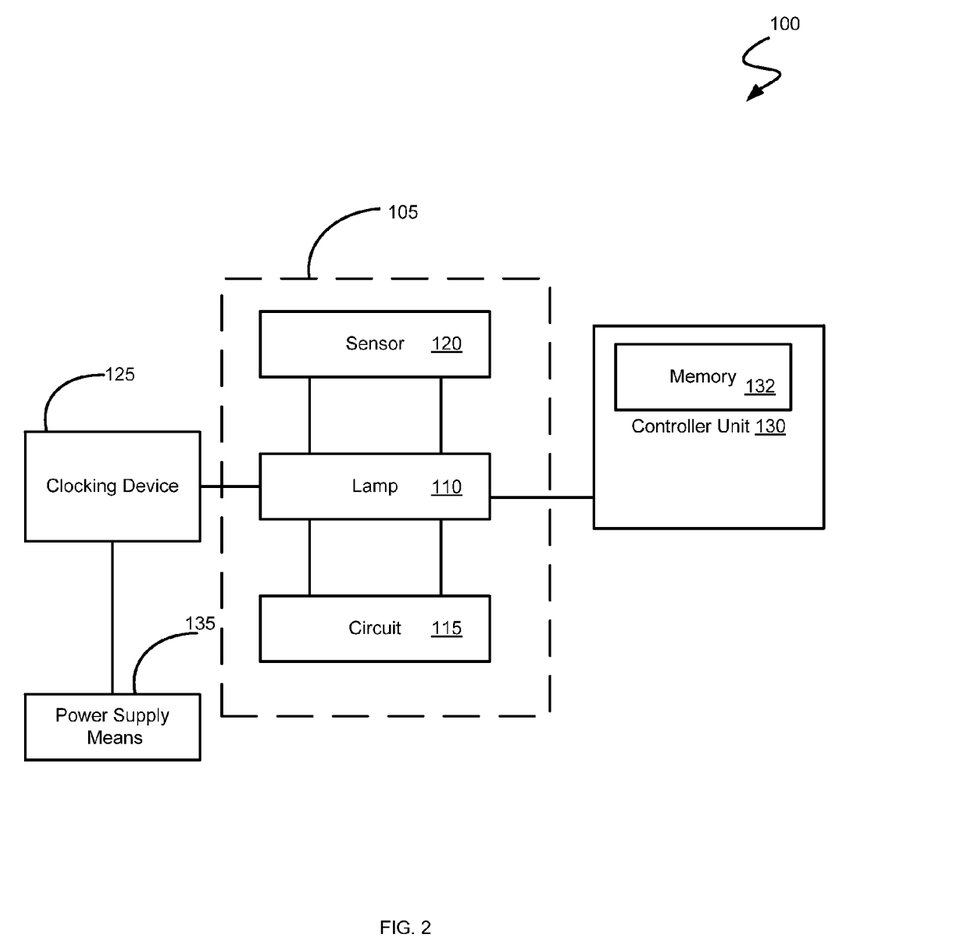
FIG. 2 illustrates a intelligent system for controlling an exterior landscape lighting system by self calibration and self adjustments in real-time, in accordance with an embodiment of the present invention.

FIG. 2 illustrates an intelligent system 100 for controlling an exterior landscape lighting system by self calibration and self adjustments in real-time, in accordance with an embodiment of the present invention. Particularly, the intelligent system 100 for controlling an exterior landscape lighting system by self calibration and self adjustments in real-time, the system 100 includes a plurality of lighting units 105, clocking device 125 electrically connected to each lighting unit 105, and the clocking device 125 being operative to calculate an optimum time period between switching on and switching off of each lighting unit 105, a power supply means 135 operable to provide electrical power for operation of the clocking device 125, and a controller unit 130 includes a memory 132 for storing a pre-recorded historical data and executing a set of instructions to control on and off times of each lighting unit 105 of the plurality of lighting units 105. More specifically, each lighting unit 105 includes a light sensor 120 and the light sensor 120 is operative to sense illumination emittance of ambient light. Particularly, each lighting unit 105 includes a control circuit 115 for controlling signals from the controller unit 130.

In preferred embodiment, the controller unit 130 performs one or more functions selected from a group including activating the clocking device 125 by applying power to the clocking device 125, processing a self-calibrated program and retrieving the pre-recorded historical data, sensing ambient light condition and designating a fixed value of illumination emittance of ambient light based on the retrieved pre-recorded historical data, setting a pre-determined optimum duration set value to the at least one lighting unit 105 based on the pre-recorded historical data, measuring a first value time duration of the actual illumination emittance of ambient light, evaluating a first measured value of illumination emittance of ambient light between lighting on and off times of the at least one lighting unit 105, evaluating a second measured value of an actual illumination emittance of ambient light in real-time, determining whether the second measured value of an actual illumination emittance of ambient light in real-time is more than the pre-determined set value of the at least one lighting unit 105, determining and deriving a new set value of illumination emittance of ambient light in real-time by iteratively averaging at least two optimum values from a previous set of iterations of the first measured value and the second measured value, storing a plurality of measured values of illumination emittance of ambient light between lighting on and off times of the at least one lighting unit 105, generating a data trend from the plurality of measured values over a period of time, comparing the data trend with the pre-recorded historical data, and determining current date, day and month of a year and right optimum duration to turn the at least one lighting unit 105 on and off at installation of the lighting system by executing the program and retrieving the pre-recorded historical data. In operation, one or more lighting units 105 are automatically switched off when the second measured value of an actual illumination emittance of ambient light in real-time is more than the pre-determined set value of the at least one lighting unit 105.

In another embodiment, one or more lighting units 105 are switched off automatically when the first value of the actual illumination emittance of ambient light in real-time is greater than the pre-determined set value of the at least one lighting unit 105.

In one embodiment, the pre-determined optimum duration is a time period for which the at least one lighting unit 105 is switched on. Particularly, the light sensor 120 is a photo sensor 120, one or more lighting units 105 include a lamp 110 and the pre-recorded historical data includes data related to number of hours of daylight per day.

In one embodiment, the exterior landscape lighting system continuously calculates on or off times of the plurality of lighting units 105 based on determined optimum duration in real-time in a closed loop pattern by executing a set of instructions of the program based on the data retrieved from the pre-recorded historical data from memory 132 and turning the at least one lighting unit 105 on and off based on calculated the on and off times.

Power supply means 135 may be a standard 115 volt, 60 Hz source supplied by a power line. It is well known to those skilled in the art that a variety of alternatives are available for power source 220. In foreign countries, power source 220 may be a 220 volt, 50 Hz source from a power line. Additionally, power source 220 may be a DC voltage source or, in certain remote regions, it may be a battery which is charged by a solar reflector.

More specifically, for countries with four seasons that includes winter, spring, summer and fall the optimum duration to determine the Measured Value will vary according to the season. For example, longer nights during winter and shorter nights during summer will have different Measured Value. Particularly, the present system 100 is programmed to know current day, month of the year because the system has a clocking device 125 and adjust the optimum duration for the Measured Value accordingly. For example in New York, (United States), it is in the month of January which is a winter season; the duration for the Measured Value can be about 15 hours. Similarly in the month of July which is a summer season in New York, the duration for the Measured Value can be about 8 hours.

In accordance with an embodiment of the present invention, the present intelligent system 100 can automatically determine the day of year. In operation, unless the system 100 has a backup battery which is maintained regularly, and if there is a lengthy power outage then the clock 125 is to be reset so the system can accurately tell the day of the year. However, this feature will make it unnecessary to reset the clock 125 as it can automatically determine the day of the year and thus determine the optimum duration to turn on the lighting of the lamp.

More specifically, each area for example, city, town or state will have specific historical data on daylight hours. Particularly, the daylight hours refers to the number of hours of daylight per day. In addition, the historical data is used as the pre-recorded data. In use, if we know the daylight hours for today, the present system compare it to the prerecorded historical data and are able to determine the date of the year. The accuracy for determining the date of the year is further improved by comparing data for a longer period in order to obtain multiple data points to produce a trend. The trend is subsequently compared with the pre-recorded historical data to accurately determine what day/date of the year it is. Once the day of year is determined, the system 100 is able to also automatically determine what should be the optimum duration.

In accordance with an embodiment of the present invention, a method to automatically operate and control an exterior landscape lighting system 100 including one or more lighting units 105, includes the steps of installing the one or more lighting units 105, activating a clocking device 125 electrically connected to the one or more lighting units 105 by applying power to the clocking device 125. More specifically, a self-calibrated program is processed and the pre-recorded historical data is retrieved from the memory 132 of the controller unit 130. The controller unit 130 is electrically coupled to the at least one lighting unit 105. In operation, the ambient light condition is sensed and a fixed value of illumination emittance of ambient light based on the retrieved pre-recorded historical data is designated.

In accordance with an embodiment of the present invention, the method further includes the steps of setting a pre-determined optimum duration set value to the one or more lighting units 105 based on the pre-recorded historical data, measuring a first value time duration of the actual illumination emittance of ambient light, and a first measured value of illumination emittance of ambient light between lighting on and off times of the at least one lighting unit 105 by the program in real-time is evaluated.

In accordance with an embodiment of the present invention, the method further includes the steps of storing a plurality of measured values of illumination emittance of ambient light between lighting on and off times of the at least one lighting unit 105 in memory 132 of the controller unit 130, generating a data trend from the plurality of measured values over a period of time, comparing the data trend with the pre-recorded historical data, and determining current date, day and month of a year and right optimum duration to turn the at least one lighting unit 105 on and off at installation of the lighting system 100 by executing the program and retrieving the pre-recorded historical data.

In accordance with an embodiment of the present invention, the pre-determined optimum duration is a time period for which the at least one lighting unit 105 is switched on.

In accordance with an embodiment of the present invention, the exterior landscape lighting system 100 is self-calibrating and self-adjusting closed loop system and continuously calculates lighting on and off optimum duration by executing a set of instructions of the program based on the data retrieved from the pre-recorded historical data from memory 132 and turning the at least one lighting unit 105 on and off based on calculated the on and off times.

In accordance with an embodiment of the present invention, the clocking device 125 is used to determine the current day of year. Particularly, the method to intelligently and automatically determine the optimum duration is important because the time the present lighting system 100 is manufactured in the factory will be different from the time the system 100 is installed in the field. For example the system 100 can be manufactured during the summer season but the system 100 could be installed in a different season. Therefore the optimum duration at the time of manufacture is different from the time of installation and it is critical to determine the right optimum duration at installation.

Figure 3:
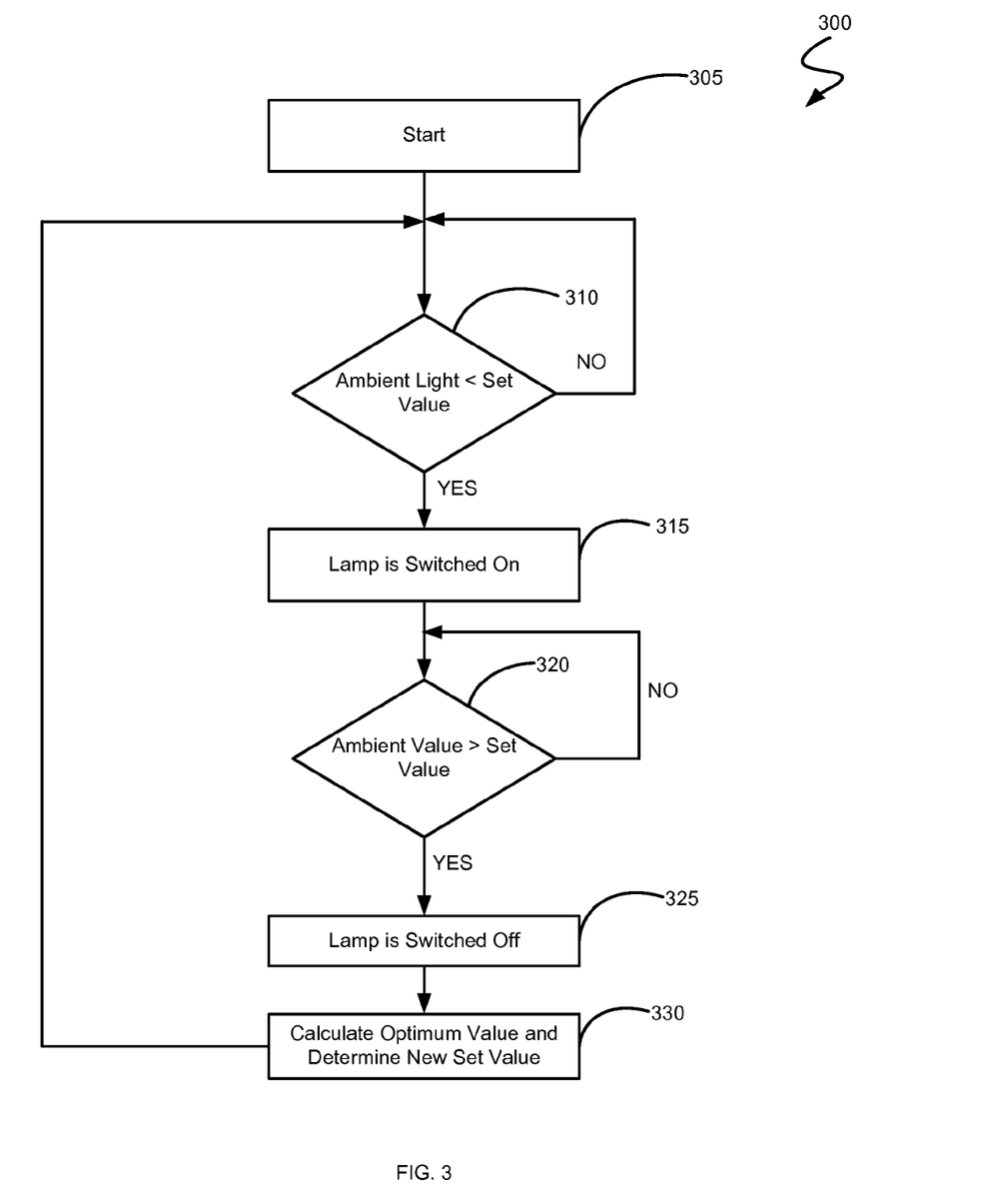
FIG. 3 illustrates a flow chart of a method to automatically operate and control an exterior landscape lighting system, in accordance with an embodiment of the present invention.

FIG. 3 illustrates a flow chart of a method 300 to automatically operate and control an exterior landscape lighting system, in accordance with an embodiment of the present invention. The method starts at step 305 and proceed to step 310. At step 310, a determination is made as to whether the first measured value of the actual illumination emittance of ambient light in real-time is less than the pre-determined set value of the lighting unit 105. If it is determined that the first measured value of the actual illumination emittance of ambient light in real-time is less than the pre-determined set value of the one or more lighting units 105 "YES", then the method 300 proceeds to step 315.

At step 315, the one or more lighting units 105 are activated automatically when the first measured value of the actual illumination emittance of ambient light in real-time is less than the pre-determined set value of the one or more lighting units 105. Subsequently, a second measured value of an actual illumination emittance of ambient light in real-time is evaluated. The method 300 proceeds to step 320. At step 320, a determination is made as to whether the second measured value of an actual illumination emittance of ambient light in real-time is more than the pre-determined set value of the at least one lighting unit 105. If it is determined that the second measured value of an actual illumination emittance of ambient light in real-time is more than the pre-determined set value of the one or more lighting units 105 "YES", then the method 300 proceeds to step 325. At step 325, the one or more lighting units 105 are automatically switched off when the second measured value of an actual illumination emittance of ambient light in real-time is more than the pre-determined set value of the lighting unit 105. The method 300 proceeds to step 330. At step 330, a third measured value of illumination emittance of ambient light in real-time is determined and a new set value of illumination emittance of ambient light in real-time is derived by iteratively averaging at least two optimum values from the previous set of iterations of the first measured value and the second measured value. Particularly, the previous set of iterations includes the first measured value, the second measured value and the like. The method 300 proceeds to step 310.

In another embodiment, if it is determined that the second measured value of an actual illumination emittance of ambient light in real-time is less than the pre-determined set value of the one or more lighting units 105 "NO", then the method 300 repeats step 320.

In another embodiment, if it is determined that the first measured value of the actual illumination emittance of ambient light in real-time is not less than the pre-determined set value of the at least one lighting unit 105 "NO", then the method 300 repeats step 310. Particularly, the one or more lighting units 105 are not switched on.

EXAMPLE

TABLE 1

| Night | Set Value | Optimum Value | Remark |
| --- | --- | --- | --- |
| Night 1 | 100 lux | 70 lux | |
| Night 2 | 70 lux | 78 lux | |
| Night 3 | 74 lux | 76 lux | 74 lux is the average between 78 lux and 70 lux. |
| Night 4 | 75 lux | 50 lux (really dark night) | 75 lux is the average between 70 lux, 78 lux and 76 lux |
| Night 5 | 69 lux | 76 lux | 69 lux is the average between 70 lux, 78 lux, 76 lux and 50 lux. |
| Night 6 | 70 lux | | 70 lux is the average between 70 lux, 78 lux, 76 lux, 50 lux and 76 lux |

As illustrated above, it is assumed and established that the optimum duration for how long the lamp should be on is 12 hours. In operation, the lamp turns on when the ambient light condition drops below 100 lux and the lamp turns off when the ambient light condition is brighter than 100 lux. More specifically, this value is called the set value. However, after the first night (Night 1), the present system measures that the duration it takes for when it drops below 100 lux to when it gets brighter than 100 lux to be 14 hours. Therefore using 100 lux as the Set Value is not optimal. However the system also measures that it takes 12 hours from the time the ambient light drops below 70 lux to when it gets brighter than 70 lux again. More specifically, this value is called the optimum value.

Subsequently, for the second night (Night 2), the system automatically uses 70 lux as the new Set Value for Night 2. Particularly, the optimum value is 78 lux (i.e. it takes 12 hours for the ambient light condition to drop below 78 lux to when it becomes brighter than 78 lux again). Therefore for Night 3, the system automatically uses 74 lux as the new Set Value. 74 lux is the average between 70 lux and 78 lux. For Night 3, the new optimum value is now 76 lux, and the new Set Value for Night 4 is 75 lux, which is the averaging of 70 lux, 78 lux and 76 lux. It is assumed that Night 4 is a really cloudy and dark night. The Measured Value is 50 lux. Therefore the Set Value for Night 5 is 69 lux which is the average between 70 lux, 78 lux, 76 lux and 50 lux. Subsequently, with the averaging effect, the impact of "one off events" like the sudden dark night in Night 4 is smoothened out by the present system 100.

Therefore, the present invention provides a method, device and system that are self calibrating and self adjusting which continuously calculates when the light should be on or off based on the optimum duration. The present intelligent system determines the most optimum condition to turn on and off the one or more street lights by utilizing preset historical data like the number of daylight hours per day to determine the day and the optimum duration to turn on the light. When the light comes on or off is then based on the optimum duration. The self calibrating and self adjusting device and system result in minimal maintenance and determine the optimum condition to turn lamp on and off. Moreover, the present invention puts technology and intelligence into such a common and established product like the street light which has been around for several years without much technological improvements. The present invention improves efficiency. It is self adjusting for the street light to turn on for an optimal duration. Particularly, the present system and device minimize accident incidents on road. The device minimizes danger and accidents because generally the conventional lamps did not turn on when it is supposed to or when it turns dark in the evening. In operation, the present system and device minimize wastage of energy because the conventional street lamps are still on when it is suppose to or when it is bright light in day time.

Further, the present invention prevents premature turning on or off of street lights. This minimizes accidents as stated above and is safe and eco friendly. The present system and device has low maintenance. Particularly, the present invention has very practical uses and application and it applies to street lights which are very widely used all over the world. The present invention also helps reduce energy wastage which is in line with the global theme of today like Go Green. More specifically, the prevent invention is useful for street light designers and manufacturers, lighting designers and manufacturers, government departments (i.e. City Council) responsible for roads and transportation and utility companies like energy companies.

While an illustrative embodiment of the present has been shown in the drawings and described in considerable detail, it should be understood that there is no intention to limit the invention to the specific form disclosed. On the contrary the intention is to cover all modifications, alternative constructions, equivalents and uses falling within the spirit and scope of the invention as expressed in the appended claims.

What is claimed is:

1. A method to automatically operate and control an exterior landscape lighting system comprising at least one lighting unit said method comprising the steps of:
   installing said at least one lighting unit;
   activating a clocking device electrically connected to said at least one lighting unit by applying power to said clocking device;
   processing a self-calibrated program and retrieving a pre-recorded historical data from memory of a controller unit, said controller unit being electrically coupled to said at least one lighting unit;
   sensing ambient light condition and designating a fixed value of illumination emittance of ambient light based on said retrieved pre-recorded historical data;
   setting a pre-determined optimum duration set value to said at least one lighting unit based on said pre-recorded historical data;
   measuring a first value time duration of said actual illumination emittance of ambient light; and
   evaluating a first measured value of illumination emittance of ambient light between lighting on and off times of said at least one lighting unit by said program in real-time.

2. The method of claim 1, wherein said at least one lighting unit is activated automatically when said first measured value of said actual illumination emittance of ambient light in real-time is less than said pre-determined set value of said at least one lighting unit.

3. The method of claim 2, wherein said method further comprises the steps of:
   evaluating a second measured value of an actual illumination emittance of ambient light in real-time;
   determining whether said second measured value of an actual illumination emittance of ambient light in real-time is more than said pre-determined set value of said at least one lighting unit.

4. The method of claim 3, wherein said at least one lighting unit is automatically switched off when said second measured value of an actual illumination emittance of ambient light in real-time is more than said pre-determined set value of said at least one lighting unit.

5. The method of claim 3, wherein said method further comprises determining and deriving a new set value of illumination emittance of ambient light in real-time by iteratively averaging at least two optimum values from a previous set of iterations of said first measured value and said second measured value, wherein said previous set of iterations comprises said first measured value, said second measured value and the like.

6. The method of claim 1, wherein said at least one lighting unit is switched off automatically when said first value of said actual illumination emittance of ambient light in real-time is greater than said pre-determined set value of said at least one lighting unit.

7. The method of claim 1, wherein said method further comprises the steps of:
   storing a plurality of measured values of illumination emittance of ambient light between lighting on and off times of said at least one lighting unit in memory of said controller unit;
   generating a data trend from said plurality of measured values over a period of time;
   comparing said data trend with said pre-recorded historical data; and
   determining current date, day and month of a year and right optimum duration to turn said at least one lighting unit on and off at installation of said lighting system by executing said program and retrieving said pre-recorded historical data.

8. The method of claim 1, wherein said pre-determined optimum duration is a time period for which said at least one lighting unit is switched on.

9. The method of claim 1, wherein said exterior landscape lighting system is self-calibrating and self-adjusting closed loop system and continuously calculates lighting on and off optimum duration by executing a set of instructions of said program based on said data retrieved from said pre-recorded historical data from memory and turning said at least one lighting unit on and off based on calculated said on and off times.

10. The method of claim 1, wherein said first value time duration of said actual illumination emittance of ambient light is measured and said at least one lighting unit is activated automatically when said first measured value is less than said set value of said at least one lighting unit.

11. The method of claim 1, wherein said at least one lighting unit comprises a lamp.

12. The method of claim 1, wherein said pre-recorded historical data comprises data related to number of hours of daylight per day.

13. An intelligent system for controlling an exterior landscape lighting system by self calibration and self adjustments in real-time, said system comprising:
   at least one lighting unit comprising a light sensor and said light sensor is operative to sense illumination emittance of ambient light;
   at least one clocking device electrically connected to the at least one lighting unit, and said at least one clocking device being operative to calculate an optimum time period between switching on and switching off the at least one lighting unit;
   a power supply means operable to provide electrical power for operation of said clocking device; and
   a controller unit comprising a memory for storing a pre-recorded historical data and executing a set of instructions to control on and off times of the at least one lighting unit, wherein said controller unit performs one or more functions selected from a group comprising:
   activating said clocking device by applying power to said clocking device;
   processing a self-calibrated program and retrieving said pre-recorded historical data;
   sensing ambient light condition and designating a fixed value of illumination emittance of ambient light based on said retrieved pre-recorded historical data;
   setting a pre-determined optimum duration set value to said at least one lighting unit based on said pre-recorded historical data;
   measuring a first value time duration of said actual illumination emittance of ambient light;
   evaluating a first measured value of illumination emittance of ambient light between lighting on and off times of said at least one lighting unit;
   evaluating a second measured value of an actual illumination emittance of ambient light in real-time;
   determining whether said second measured value of an actual illumination emittance of ambient light in real-time is more than said pre-determined set value of said at least one lighting unit;
   determining a third measured value of illumination emittance of ambient light in real-time and deriving a new set value of illumination emittance of ambient light in real-time by iteratively averaging at least two optimum values from a previous set of iterations of said first measured value and said second measured value, wherein said previous set of iterations comprises said first measured value, said second measured value and the like;

storing a plurality of measured values of illumination emittance of ambient light between lighting on and off times of said at least one lighting unit;

generating a data trend from said plurality of measured values over a period of time;

comparing said data trend with said pre-recorded historical data; and determining current date, day and month of a year and right optimum duration to turn said at least one lighting unit on and off at installation of said lighting system by executing said program and retrieving said pre-recorded historical data;

wherein said at least one lighting unit is automatically switched off when said second measured value of an actual illumination emittance of ambient light in real-time is more than said pre-determined set value of said at least one lighting unit, and wherein said at least one lighting unit is switched off automatically when said first value of said actual illumination emittance of ambient light in real-time is greater than said pre-determined set value of said at least one lighting unit.

14. The intelligent system of claim 13, wherein the at least one lighting unit comprises a control circuit for controlling signals from said controller unit.

15. The intelligent system of claim 13, wherein said pre-determined optimum duration is a time period for which said at least one lighting unit is switched on.

16. The intelligent system of claim 13, wherein said light sensor is a photo sensor, said at least one lighting unit is a lamp and said pre-recorded historical data comprises data related to number of hours of daylight per day.

17. The intelligent system of claim 13, wherein said exterior landscape lighting system continuously calculates on or off times of said at least one lighting unit based on determined optimum duration in real-time in a closed loop pattern by executing a set of instructions of said program based on said data retrieved from said pre-recorded historical data from memory and turning said at least one lighting unit on and off based on calculated said on and off times.

18. A device to automatically control on and off timing of an exterior landscape lighting system comprising:

at least one clocking device electrically connected to each lighting unit of said exterior landscape lighting system, wherein said at least one clocking device is operative to calculate an optimum time period between switching on and switching off of each lighting unit;

a power supply means operable to provide electrical power for operation of each clocking device;

a controller unit comprising a memory for storing a pre-recorded historical data and executing a set of instructions to control on and off times of at least one lighting unit of said exterior landscape lighting system; and a program to calculate lighting on and off times by retrieving data from said pre-recorded historical data, wherein said controller unit performs one or more functions selected from a group comprising:

activating said clocking device by applying power to said clocking device;

processing a self-calibrated program and retrieving said pre-recorded historical data;

sensing ambient light condition and designating a fixed value of illumination emittance of ambient light based on said retrieved pre-recorded historical data;

setting a pre-determined optimum duration set value to said at least one lighting unit based on said pre-recorded historical data;

measuring a first value time duration of said actual illumination emittance of ambient light;

evaluating a first measured value of illumination emittance of ambient light between lighting on and off times of said at least one lighting unit;

evaluating a second measured value of an actual illumination emittance of ambient light in real-time;

determining whether said second measured value of an actual illumination emittance of ambient light in real-time is more than said pre-determined set value of said at least one lighting unit;

determining a third measured value of illumination emittance of ambient light in real-time and deriving a new set value of illumination emittance of ambient light in real-time by iteratively averaging at least two optimum values from a previous set of iterations of said first measured value and said second measured value, wherein said previous set of iterations comprises said first measured value, said second measured value and the like;

storing a plurality of measured values of illumination emittance of ambient light between lighting on and off times of said at least one lighting unit;

generating a data trend from said plurality of measured values over a period of time;

comparing said data trend with said pre-recorded historical data; and determining current date, day and month of a year and right optimum duration to turn said at least one lighting unit on and off at installation of said lighting system by executing said program and retrieving said pre-recorded historical data;

wherein said at least one lighting unit is automatically switched off when said second measured value of an actual illumination emittance of ambient light in real-time is more than said pre-determined set value of said at least one lighting unit; and wherein said at least one lighting unit is switched off automatically when said first value of said actual illumination emittance of ambient light in real-time is greater than said pre-determined set value of said at least one lighting unit.

19. The device of claim 18, wherein each lighting unit comprises a control circuit for controlling signals from said controller unit.

20. The device of claim 18, wherein said pre-determined optimum duration is a time period for which said at least one lighting unit is switched on.

21. The device of claim 18, wherein said pre-recorded historical data comprises data related to number of hours of daylight per day.

* * * * *